United States Patent Office 3,228,064
Patented Jan. 11, 1966

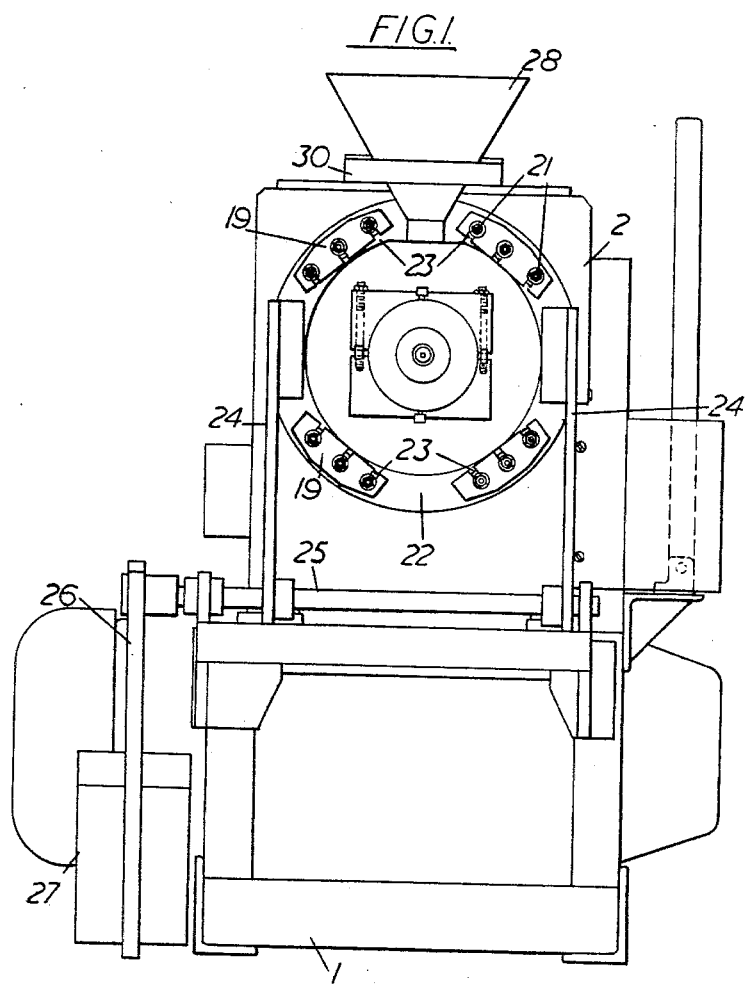

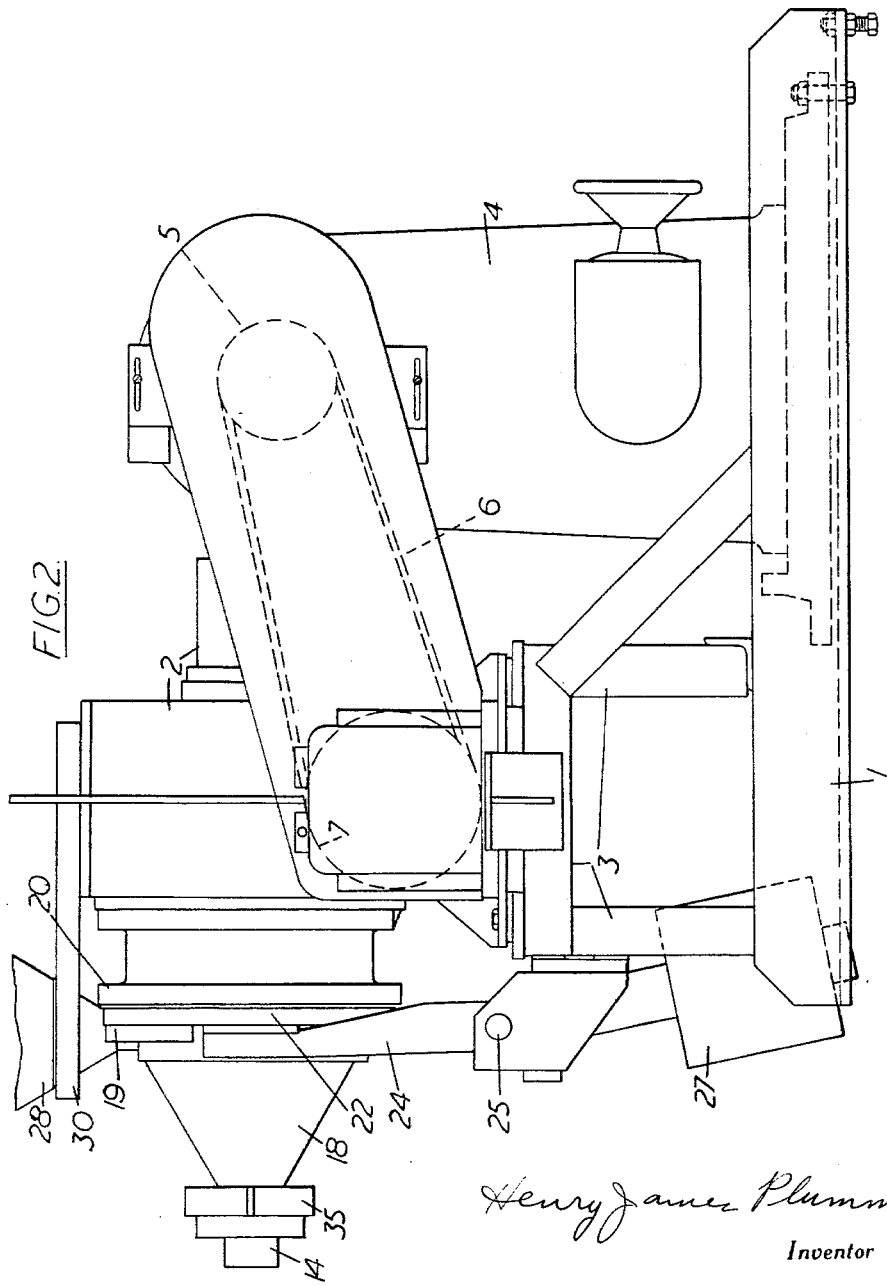

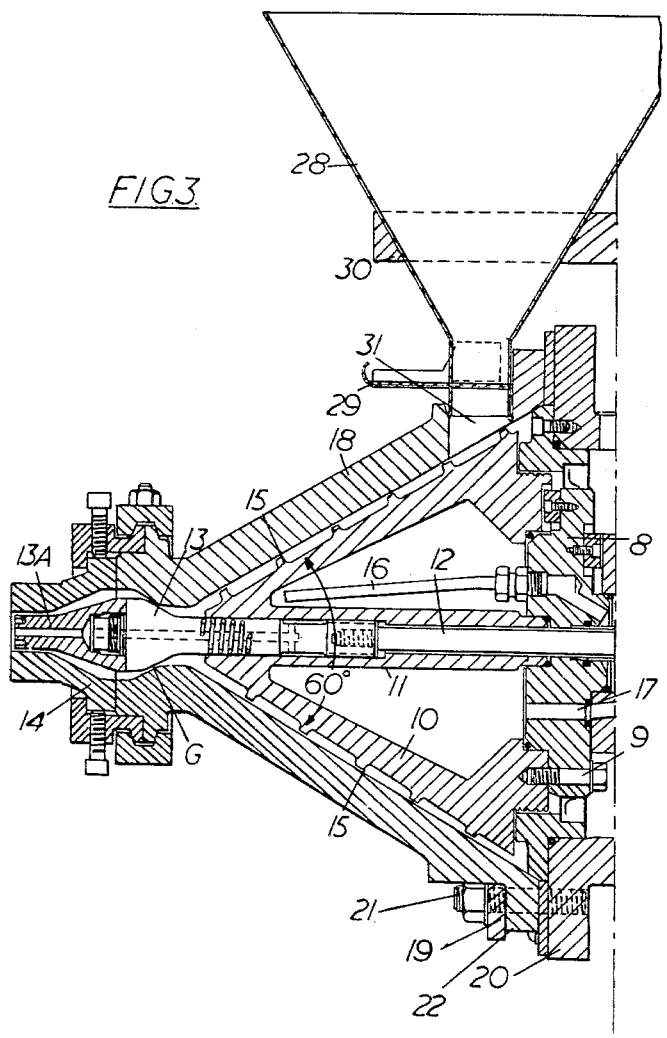

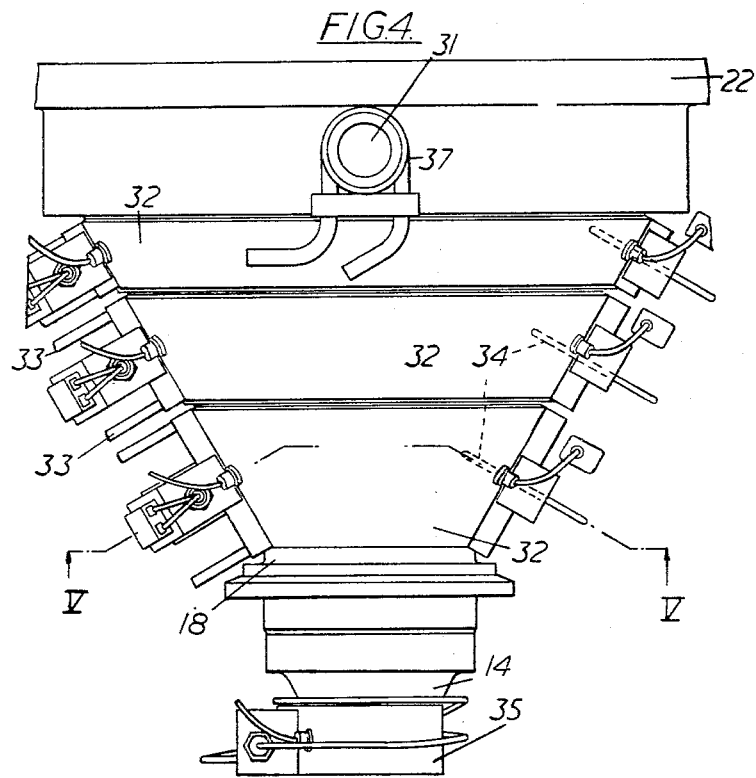
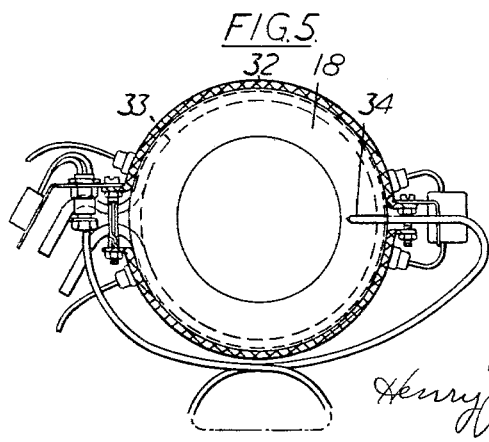

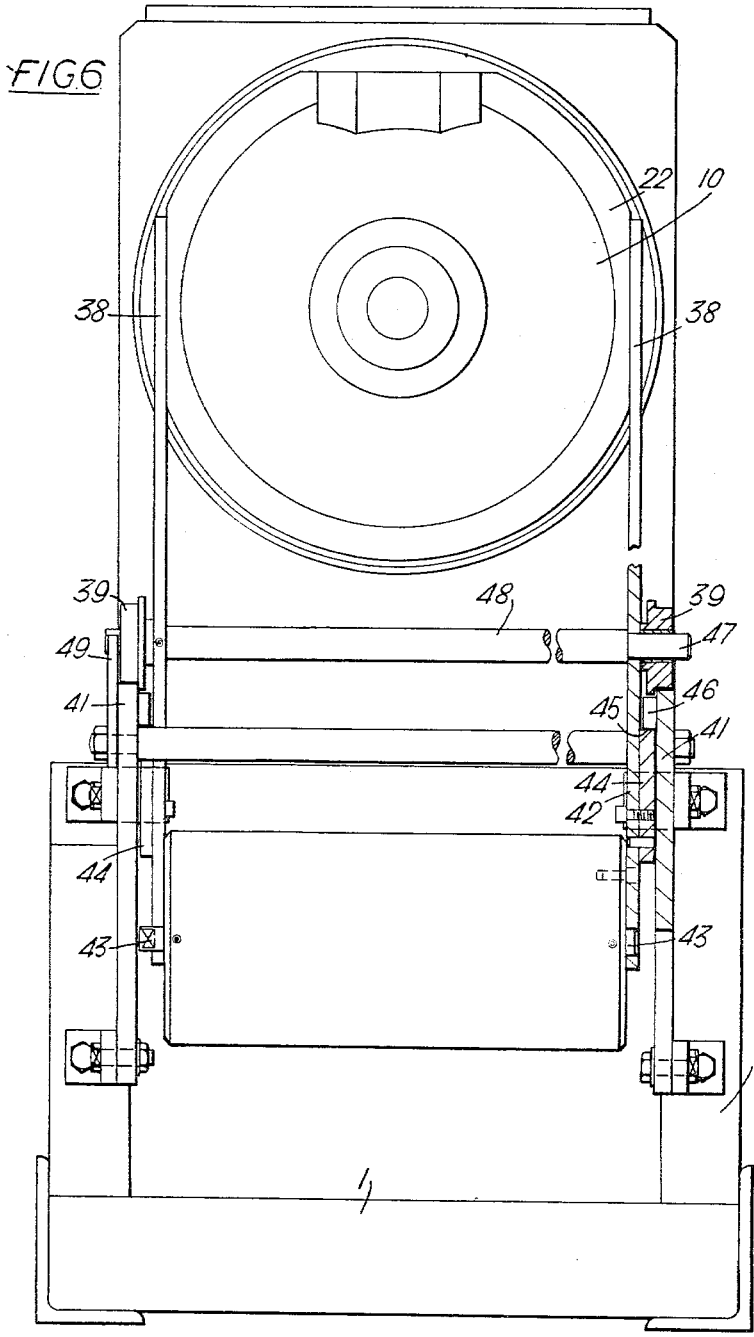

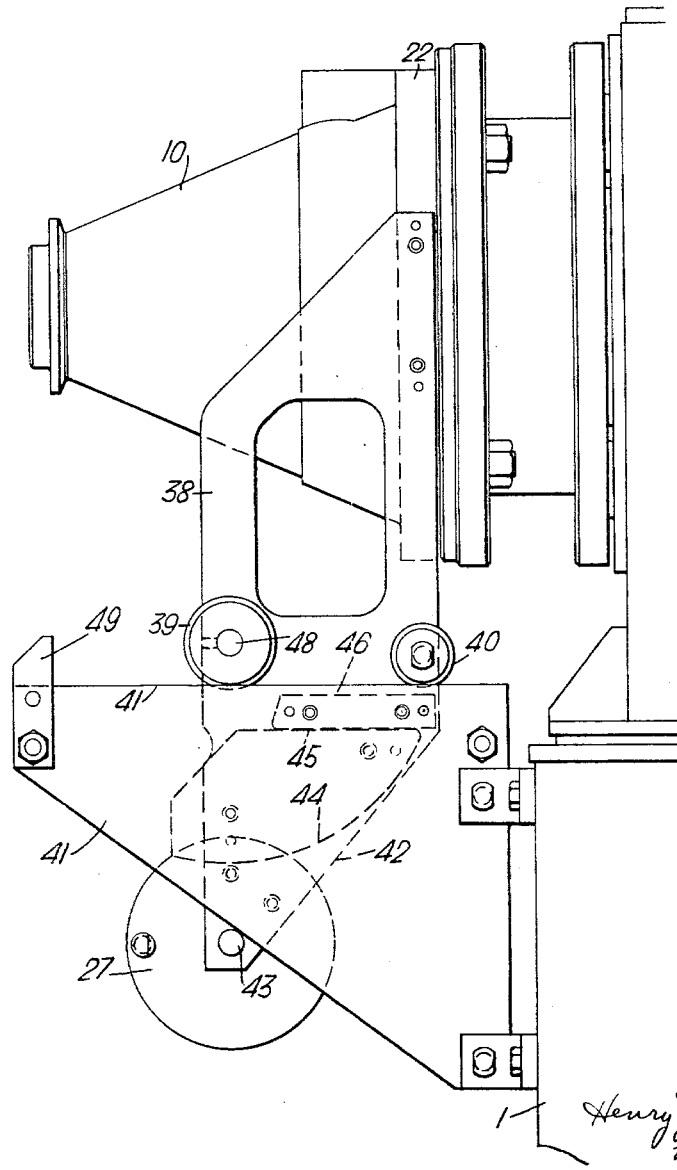

---

3,228,064
EXTRUDING OR COMPOUNDING MACHINE FOR PLASTIC MATERIALS
Henry James Plummer, Woodley, England, assignor to Cyril Adams & Company Limited, New Barnet, England
Filed May 22, 1963, Ser. No. 282,456
8 Claims. (Cl. 18—12)

This invention relates to an extruding or compounding machine for plastic materials.

Modern extruding machines for plastic materials employ long feed screws of the order of from 3 feet to 14 feet in length rotating in a barrel to which is connected the die head, electric strip heaters, cooling tubes and temperature-measuring devices. The dismantling and cleaning of the feed screw and barrel are time-consuming, laborious operations and can take as long as four hours since the dismantling at least involves detachment of the strip heaters, stripping of the die head which may consist of four to seven parts, the removal of a breaker plate which supports the point of the die and the removal of a flange which holds the die head onto the barrel from which eventually the feed screw is withdrawn lengthwise.

With a view to considerably reducing the disassembly operations and time, an extruding or compounding machine, according to this invention, for plastic materials comprises within a barrel a feed screw body substantially in the form of a cone provided on its surface with helical screw flights, and means for enabling the barrel together, if desired, with heating and cooling parts still connected thereto to be swung clear of the feed screw cone to facilitate cleaning thereof and the inside of the barrel.

As will be apparent from the following description of one embodiment of extruding machine according to this invention there are important advantages arising from the employment of a helical feed screw cone, the angle of which is 60°.

In the accompanying drawings:

FIG. 1 is a front elevation of an extrusion machine for plastic materials embodying one example of this invention.

FIG. 2 is a side elevation corresponding to FIG. 1.

FIG. 3 is a sectional elevation showing on an enlarged scale the upper, left-hand part of FIG. 2.

FIG. 4 is a plan view corresponding to FIG. 3 with the addition of electric strip heaters and other parts.

FIG. 5 is a front sectional elevation taken on the line V—V, FIG. 4.

FIGS. 6 and 7 are respectively a front elevation, partly in section, and a side elevation of the front part of the extrusion machine, said figures illustrating a modification of this invention.

Since the general construction of the extruding machine as a whole forms no part of this invention, FIGS. 1 and 2 merely show the general arrangement of the machine, viz, a base 1, a housing 2 supported on the base 1 by a structure 3, a rear enclosure 4 for a variable speed drive mechanism, and parts 5, 6, 7 for rotating a hollow drive shaft mounted in and at the end of housing 2.

Referring to FIG. 3, the drive shaft carries at its forward end a plate 8 to which is secured by screws 9 a feed screw cone 10 according to this invention. The cone 10 is a hollowed-out body having an axial sleeve 11 through which passes a bar 12 which is supported in the rear of housing 2 where it may be axially adjusted, for example, by hydraulic means. The forward end of the bar 12 is connected to a die mandrel 13 carrying a replaceable point 13A arranged within a replaceable nozzle 14. The mandrel is solely supported in the forward end of cone 10 and thus dispenses with the usual spider for supporting the mandrel. The size of cone 10, according to one practical embodiment, has a diameter of 13.5" at the large, rear end, a diameter of 2.4" at the front, small end and a length of 9.7". The angle of the cone is 60°. The surface of the cone carries helical screw flights 15 having a 2" lead. The screw flights may have any desired cross-section and may resemble the principal forms of screw-thread, such as triangular or square threads. This feed screw cone is equivalent to a screw of 1.88" diameter and having a length of 47" as used in a conventional screw-type extruder. The feed screw cone 10 has a speed range of 6.25–62.5 r.p.m. The cone is heated or cooled by water circulation, the inlet and outlet being designated 16, 17, respectively.

The cone feed screw 10 rotates with a small clearance inside a conical barrel 18 to the small, front end of which the die nozzle 14 is detachably connected. The rear, large end of barrel 18 is held by clamping plates 19 onto a flange 20 at the front end of housing 2. As shown in FIG. 1, there are four plates 19 through which pass screw bolts 21, FIG. 3, screwed into flange 20 of housing 2 and passing through slots in flange 22 of barrel 18. When clamping nuts on bolts 21 are removed the clamping plates 19, which have slots 23, may be slid off the bolts. The barrel flange 22 is attached to a pair of side arms 24 connected to a horizontal shaft 25 which by means of an arm 26 carries a counterweight 27.

A feed hopper 28 having a sliding shutter 29 is mounted in a collar 30 carried from the top of housing 2 as shown in FIG. 2. The hopper, which is vertically movable by an arm, not shown, registers at its throat with an opening 31 in the barrel 18 so that when the shutter is open material from the hopper may be admitted to the space between the cone screw and barrel at the large diameter end thereof.

Referring to FIGS. 4 and 5, electric strip heaters 32, of known kind, providing three heating zones, which can be individually controlled manually or automatically, are clamped around the barrel 18. Also, cooling water is supplied to cooling tubes 33 in each of the three heating zones of the barrel and a thermocouple 34 is provided for each heater. All these parts are well known in the art and need not be further described. An electric strip heater 35 and a thermocouple 36 are also provided for the die head in usual manner. A water-cooled collar 37, FIG. 4, is provided at the material entry part of the barrel.

In use of the extruder hereinbefore described, plastics material, for example polyvinyl chloride, enters the barrel at the large end thereof through the water-cooled collar 37 and is conveyed by the screw feed cone 10, 15 to the opposite end and is forced out through the annular passage formed by the barrel 18 and nozzle 14 on the one hand and the mandrel 13 on the other hand. A water-jacketed sizing former may be attached to the nozzle 14 for the well-known purpose of establishing the finished outside diameter of an extruded tube which, in passing through the former, is also partially set and given dimensional stability to enable it to retain its size as it passes on to a cooling bath. The nozzle 14 and point 13A are replaceable parts chosen to suit the size and thickness of extruded tubing desired. Counterpressure in the plasticising zone is maintained by the restriction G in the annular passage formed by the mandrel 13 and forward end of the barrel. This restriction can be varied by longitudinal adjustment of the mandrel 13, this being effected by controlled movement of bar 12.

The cone feed screw may be machined and precisely ground on standard grinding machines. By axial adjustment of the cone screw, precise clearance between the screw flights and barrel can be obtained. The overall size and the cost of manufacture of the machine, as compared with conventional screw-type extruders, will be substantially reduced. Further, since the cone screw is of comparatively short length and has adequate bearing support, torque deflections are reduced almost to a minimum so that wear of flights and barrel through torque deflections is unlikely to occur. The extrusion stresses are mainly absorbed by the bearings and a more robust machine, as compared with the conventional screw-type extruder, results. Finally, since the peripheral speed of the cone screw progressively reduces towards the extrusion die the presence of static zones in the travel of the material is less likely to occur, particularly as the travel is, in effect, down an inclined plane. As a consequence, the risk of decomposition of the material while under heat at static zones is considerably reduced, if not entirely avoided. Moreover, the forward end of the cone solely supports the mandrel 13 and eliminates the need for the usual vanes or a breaker plate in the annular passage. As a result, seams and stresses in the extruded tubing are avoided.

The cone feed screw having an angle of 60° confers the outstanding advantage, however, of facilitating the opening of the barrel for cleaning purposes at the end of an extrusion operation or in an emergency due to degradation of material in the event of overheating. To achieve such opening, it is merely necessary to raise hopper 28 away from the barrel 18, remove clamping plates 19, detach the nozzle 14 and remove the mandrel 13, whereupon the barrel 18 can be swung down from the working position against the action of the counterweight 27. The detachment of the strip heaters 32, cooling tubes 33 and thermocouples 34 is usually unnecessary since the connections thereto are flexible and are able to follow the opening movement of the barrel. The entire opening operation can be performed in about 5–10 minutes.

It is to be understood that this invention is not limited to application to an extruding machine as hereinbefore described with reference to the drawings, but may also be applied to a compounding machine for plastics materials. In such application, a pair of cone screws having meshing or non-meshing flights are arranged with their axes at an angle to each other, the two cones together defining an apex angle of, say, 120°. The twin cone screws are contained within a barrel which may be swung down from the working position, for instance in a manner similar to that hereinbefore described. Each cone is carried at the forward end of a spindle mounted in bearings, each spindle being driven at the same speed via suitable gearing, including bevel gears. The twin cone screws are contained in a housing which includes a front section carrying the extrusion die. The material is compounded while being progressed by the inter-engaging flights to the extrusion die from which emerge extruded shapes that are subsequently converted into granular material.

The invention is not limited to a single screw angle of 60° or to a twin screw angle of 120°. Depending on the angle of the single or twin cone feed screw it may be found necessary to slide the barrel 18 forward axially before swinging it away from its working position. This modification is illustrated by way of example in FIGS. 6 and 7 in which parts similar to FIGS. 1 and 2 are designated by like reference numerals. In FIGS. 6 and 7 the barrel flange 22 has attached thereto, at opposite sides, depending arms or brackets 38, each carrying at the lower end front and rear rollers 39, 40, respectively. These rollers run on tracks formed by the horizontal top surfaces of plates 41 secured to the frame structure 1. Each bracket 38 has a lower extension 42 and between these extensions a counterweight 27 is supported by pins 43. To the outside surface of each extension 42 is secured a segment-like member 44 having the shape clearly shown in FIG. 7. In the working position of the barrel 18, FIG. 7, the top horizontal surfaces 45 of the segments 44 are positioned adjacent stop plates 46 secured to the inner surfaces of plates 41 and thus co-operate to prevent swinging of the barrel about the axis of front rollers 39. After removal of the clamping plates 19 of FIGS. 1 and 2, the barrel may be manually moved forward as a result of bracket rollers 39, 40 running on tracks 41. When the extension 47 of a pin 48, on which rollers 39 are mounted, meet stops 49 secured to the plates 41, forward movement of the barrel is interrupted and then the barrel can be swung down due to the brackets 38 pivoting about pin 48 and owing to the fact that segments 44 have been moved clear of stop plates 46. The extent of forward travel of the barrel is sufficient to allow it to be swung down without first removing the die and mandrel. Before the barrel can be returned to the working position it must be swung back to the horizontal position as otherwise by a rear sliding movement of the barrel the segments 44 would foul the stop plates 46. The segments 44 and plates 46 together constitute a means of ensuring a correct sequence of movements for the barrel 18 and thus safeguard the flights on the cone 10 from damage by the barrel.

Having now particularly described my invention what I desire to secure by Letters Patent of the U.S. and what I claim is:

1. In an extruding machine for continuous extrusion of plastic materials, the combination of a supporting structure, an extrusion barrel mounted on said supporting structure and having a conical interior, a conical feed screw rotatable within said barrel and supported by said supporting structure, plastic material feed means mounted on said supporting structure and opening into said extrusion barrel, and means operatively associated with said barrel for enabling said barrel to be swung clear to said feed screw to expose the entire working surface of said feed screw without completely detaching said barrel from said supporting structure.

2. The combination as claimed in claim 1 in which said means comprises members depending from said barrel and a horizontal shaft beneath said barrel to which the lower ends of said members are connected, whereby said barrel can be swung down about the axis of said horizontal shaft from its normal operative position.

3. The combination as claimed in claim 1, including a die mandrel, means for supporting said mandrel solely within the forward end of said feed screw, a bar connected to the rear end of said mandrel, and means for adjusting said bar axially from the rear end thereof to regulate the position of said mandrel.

4. In an extruding machine for continuous extrusion of plastic materials, the combination of a supporting structure, an extrusion barrel mounted on said supporting structure and having a conical interior, a conical feed screw rotatable within said barrel and supported by said supporting structure, plastic material feed means mounted on said supporting structure and opening into said extrusion barrel, means on which said barrel is mounted for enabling said barrel to be moved a predetermined distance forwardly from said feed screw, and means operatively associated with said barrel and said first mentioned means for enabling said barrel to be swung clear of said feed screw to expose the entire working surface of said feed screw without completely detaching said barrel from said supporting structure.

5. The combination as claimed in claim 4, said means for allowing forward movement of the barrel includes a track beneath said barrel, depending members carried by a part of the said barrel, and rollers carried by said depending members and running on said track.

6. The combination as claimed in claim 4, including means for preventing the barrel from being swung away from its working position until after it has been moved forwardly a predetermined distance.

7. The combination as claimed in claim 4, including a die mandrel, means for supporting said mandrel solely within the forward end of said feed screw, a bar connected to the rear end of said mandrel, and means for adjusting said bar axially from the rear end thereof to regulate the position of said mandrel.

8. In an extruding machine for continuous extrusion of plastic materials, the combination of a supporting structure, an extrusion barrel mounted on said supporting structure and having a conical interior, a conical feed screw rotatable within said barrel and supported by said supporting structure, plastic material feed means mounted on said supporting structure and opening into said extrusion barrel, and means operatively associated with said barrel pivotally mounting said barrel at a point spaced transversely of the axis of the barrel and said feed screw and transversely of the exterior surface of said barrel and having a counterweight thereon for enabling said barrel to be swung clear of said feed screw to expose the entire working surface of said feed screw without completely detaching said barrel from the supporting structure and with a minimum of effort for swinging the barrel.

References Cited by the Examiner

UNITED STATES PATENTS

| | | | |
|---|---|---|---|
| 72,393 | 12/1867 | Hale | 25—14 |
| 148,211 | 3/1874 | Haven | 107—14 |
| 591,520 | 10/1897 | Zoeller | 18—12 |
| 1,466,509 | 8/1923 | Laskey | 18—12 |
| 1,777,294 | 10/1930 | Dellenbarger | 107—14 |
| 2,061,407 | 11/1936 | Royle | 18—12 |
| 2,461,630 | 2/1949 | Cozzo | 18—14 |
| 2,626,133 | 1/1953 | Reed | 107—14 X |
| 2,680,880 | 6/1954 | Corbett. | |
| 2,970,817 | 2/1961 | Gurley | 18—12 |
| 3,001,233 | 9/1961 | Ernst | 18—30 |
| 3,044,391 | 7/1962 | Pellett | 25—14 X |
| 3,051,990 | 9/1962 | Peterson | 18—14 |
| 3,102,717 | 9/1963 | Frenkel | 18—12 X |

FOREIGN PATENTS

| | | |
|---|---|---|
| 828,144 | 2/1960 | Great Britain. |
| 341,307 | 11/1959 | Switzerland. |

J. SPENCER OVERHOLSER, *Primary Examiner*.

ROBERT F. WHITE, *Examiner*.